US012662406B2

(12) United States Patent
Gallagher et al.

(10) Patent No.: US 12,662,406 B2
(45) Date of Patent: Jun. 23, 2026

(54) ONLINE BIOLOGICAL MONITORING IN DECENTRALIZED NON-POTABLE WATER SYSTEM

(71) Applicant: NATURAL SYSTEMS UTILITIES, LLC, Hillsborough, NJ (US)

(72) Inventors: Zach F. Gallagher, Hillsborough, NJ (US); Sheng Chu, Hillsborough, NJ (US)

(73) Assignee: NATURAL SYSTEMS UTILITIES, LLC, Hillsborough, NJ (US)

( * ) Notice: Subject to any disclaimer, the term of this patent is extended or adjusted under 35 U.S.C. 154(b) by 534 days.

(21) Appl. No.: 17/807,096

(22) Filed: Jun. 15, 2022

(65) Prior Publication Data

US 2022/0396514 A1     Dec. 15, 2022

Related U.S. Application Data

(60) Provisional application No. 63/210,915, filed on Jun. 15, 2021.

(51) Int. Cl.
*C02F 9/20*          (2023.01)
*C02F 1/00*          (2023.01)
(Continued)

(52) U.S. Cl.
CPC ............... *C02F 9/20* (2023.01); *C02F 1/001* (2013.01); *C02F 3/1268* (2013.01); *C02F 1/004* (2013.01); *C02F 1/008* (2013.01); *C02F 1/32* (2013.01); *C02F 1/444* (2013.01); *C02F 1/78* (2013.01); *C02F 3/28* (2013.01); *C02F 2103/002* (2013.01); *C02F 2103/005* (2013.01);
(Continued)

(58) Field of Classification Search
CPC .. C02F 9/20; C02F 1/001; C02F 1/004; C02F 1/008; C02F 1/32; C02F 1/444; C02F 1/78; C02F 3/1268; C02F 3/28; C02F 2103/002; C02F 2103/005; C02F 2103/023; C02F 2209/008; C02F 2209/02; C02F 2209/06; C02F 2209/10; C02F 2209/11; C02F 2209/36; C02F 2303/04; C02F 2303/10
USPC ..... 210/614, 739, 747.2, 747.3, 748.11, 749, 210/760, 143, 170.03, 175, 194, 259
See application file for complete search history.

(56) References Cited

U.S. PATENT DOCUMENTS

2013/0015137 A1*  1/2013  Urmenyi .............. B01D 37/048
                                                            210/744
2017/0158537 A1*  6/2017  Buschmann ............ C02F 1/722
(Continued)

FOREIGN PATENT DOCUMENTS

BE          1021278 B1 * 10/2015
CN       114933386 A  *  8/2022  ................ C02F 1/32

OTHER PUBLICATIONS

Machine-generated English translation of BE 1021278, generated on Oct. 29, 2024.*

(Continued)

*Primary Examiner* — Fred Prince
(74) *Attorney, Agent, or Firm* — Lando & Anastasi, LLP

(57)          ABSTRACT
A total biological count associated with treated water produced by a wastewater treatment system may be monitored online in a decentralized non-potable water system. Preventative and/or corrective action can be taken in response to a deviation from a predetermined threshold level.

34 Claims, 11 Drawing Sheets

Water Reuse System

(51) Int. Cl.

| | |
|---|---|
| *C02F 1/32* | (2023.01) |
| *C02F 1/78* | (2023.01) |
| *C02F 3/12* | (2023.01) |
| *C02F 3/28* | (2023.01) |
| *C02F 1/44* | (2023.01) |
| *C02F 103/00* | (2006.01) |
| *C02F 103/02* | (2006.01) |

(52) U.S. Cl.
CPC .. *C02F 2103/023* (2013.01); *C02F 2209/008* (2013.01); *C02F 2209/02* (2013.01); *C02F 2209/06* (2013.01); *C02F 2209/10* (2013.01); *C02F 2209/11* (2013.01); *C02F 2209/36* (2013.01); *C02F 2303/04* (2013.01); *C02F 2303/10* (2013.01)

(56) References Cited

U.S. PATENT DOCUMENTS

| | | | |
|---|---|---|---|
| 2020/0208848 A1* | 7/2020 | Muxworthy | F24D 17/02 |
| 2020/0331783 A1* | 10/2020 | Whalen | C02F 3/006 |

OTHER PUBLICATIONS

Machine-generated English translation of CN 114933386, generated on Oct. 29, 2024.*

Applitek, EZ-ATP On-Line Microbiology Analyzer, https://web.archive.org/web/20201031130252/http://www.applitek.com:80/products/ez-atp, Oct. 31, 2020.*

\* cited by examiner

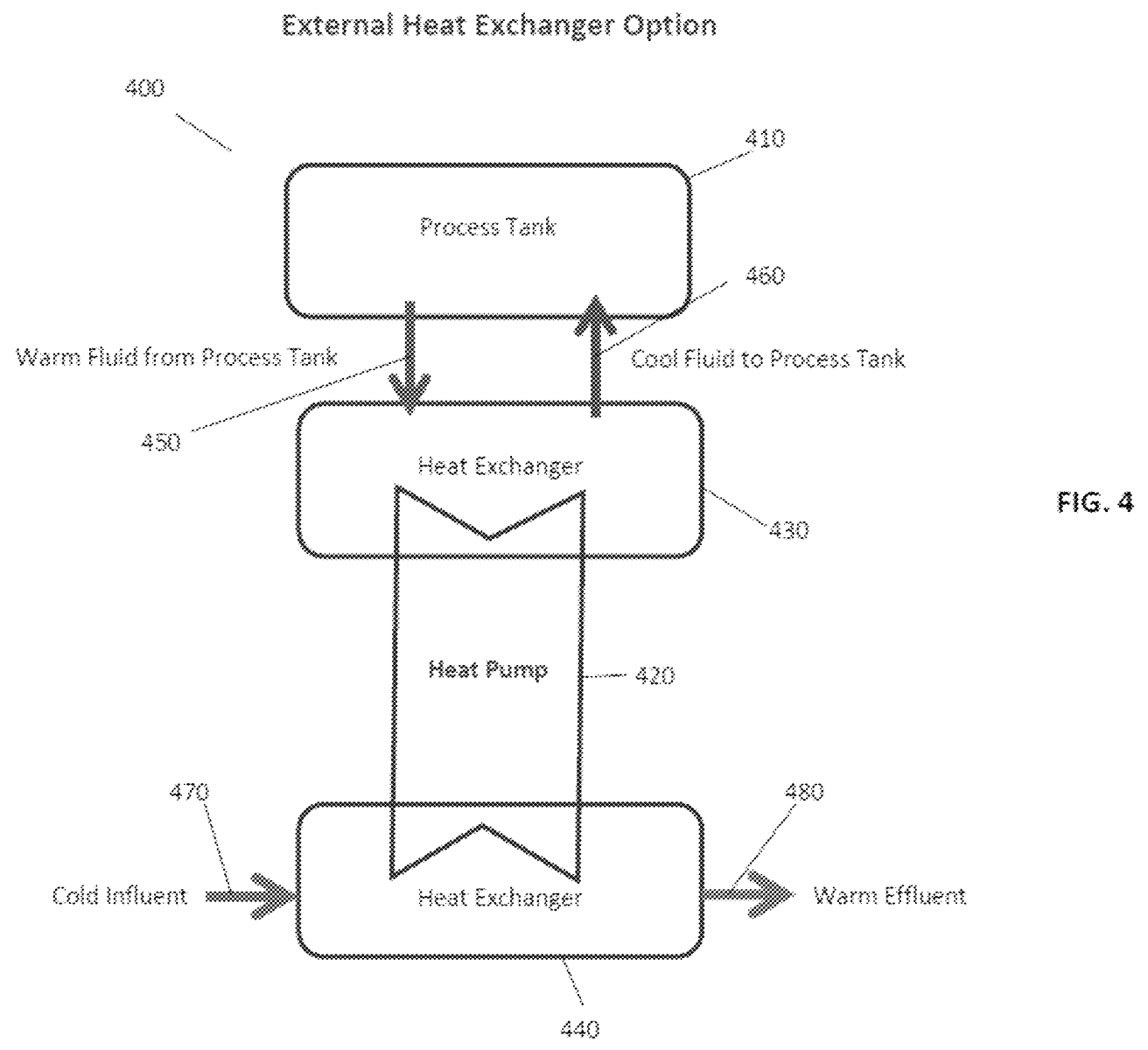

External Heat Exchanger Option

400

410 Process Tank

460 Cool Fluid to Process Tank

450 Warm Fluid from Process Tank

430 Heat Exchanger

420 Heat Pump

440 Heat Exchanger

470 Cold Influent

480 Warm Effluent

FIG. 4

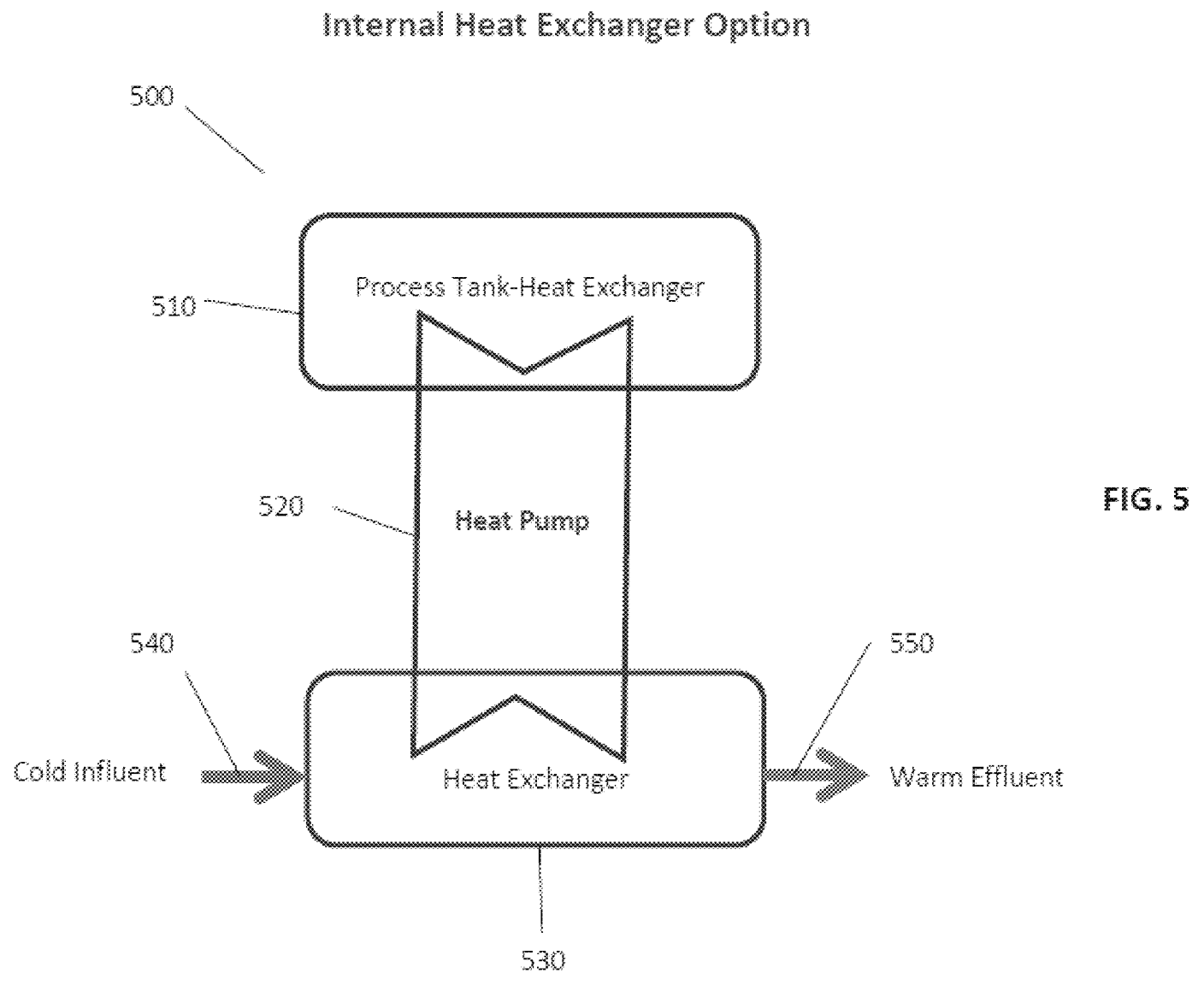

Internal Heat Exchanger Option

500

510    Process Tank-Heat Exchanger

Heat Pump

520

530    Heat Exchanger

540    Cold Influent

550    Warm Effluent

FIG. 5

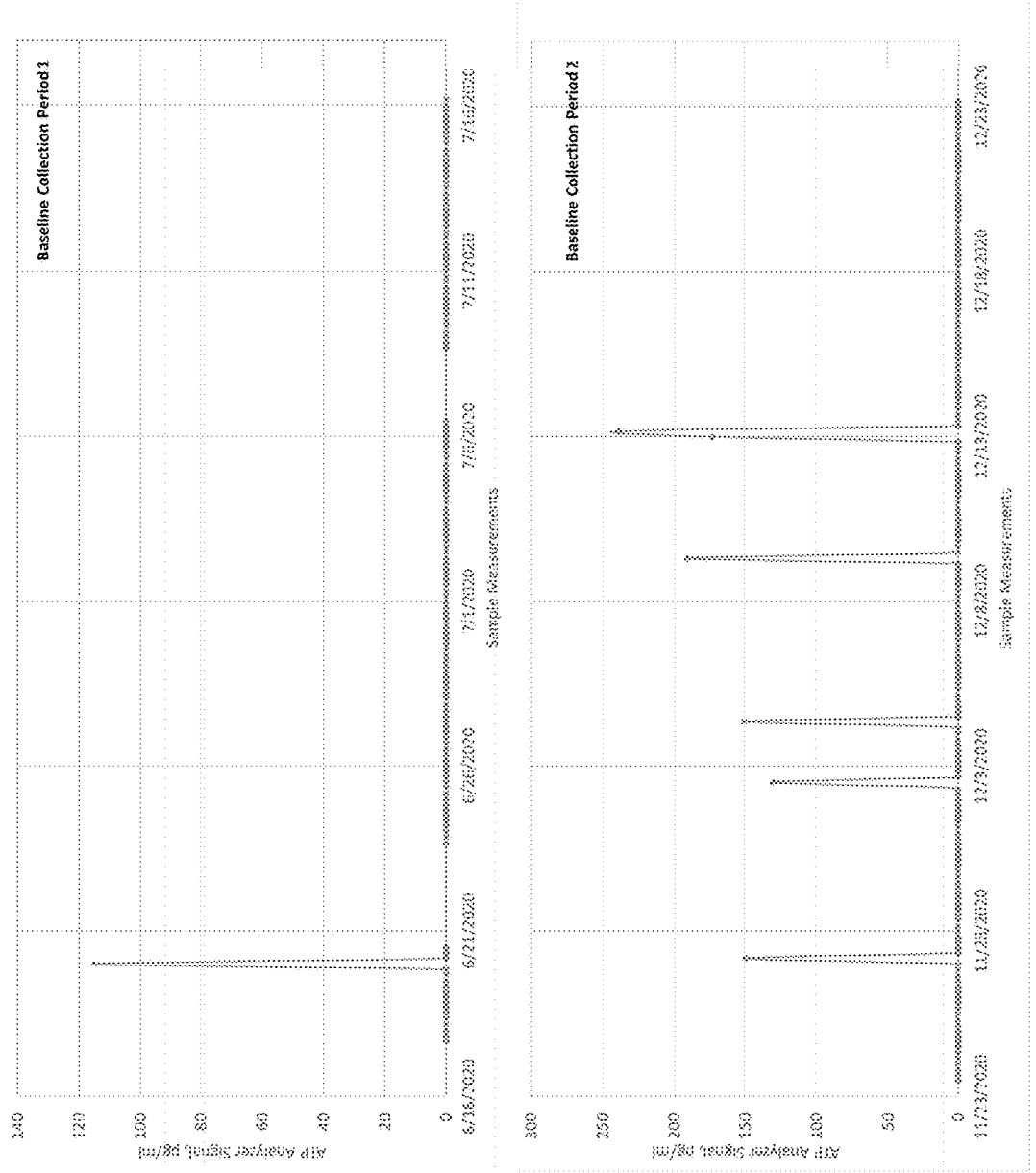
FIG 7. Baseline Signal under normal operation conditions

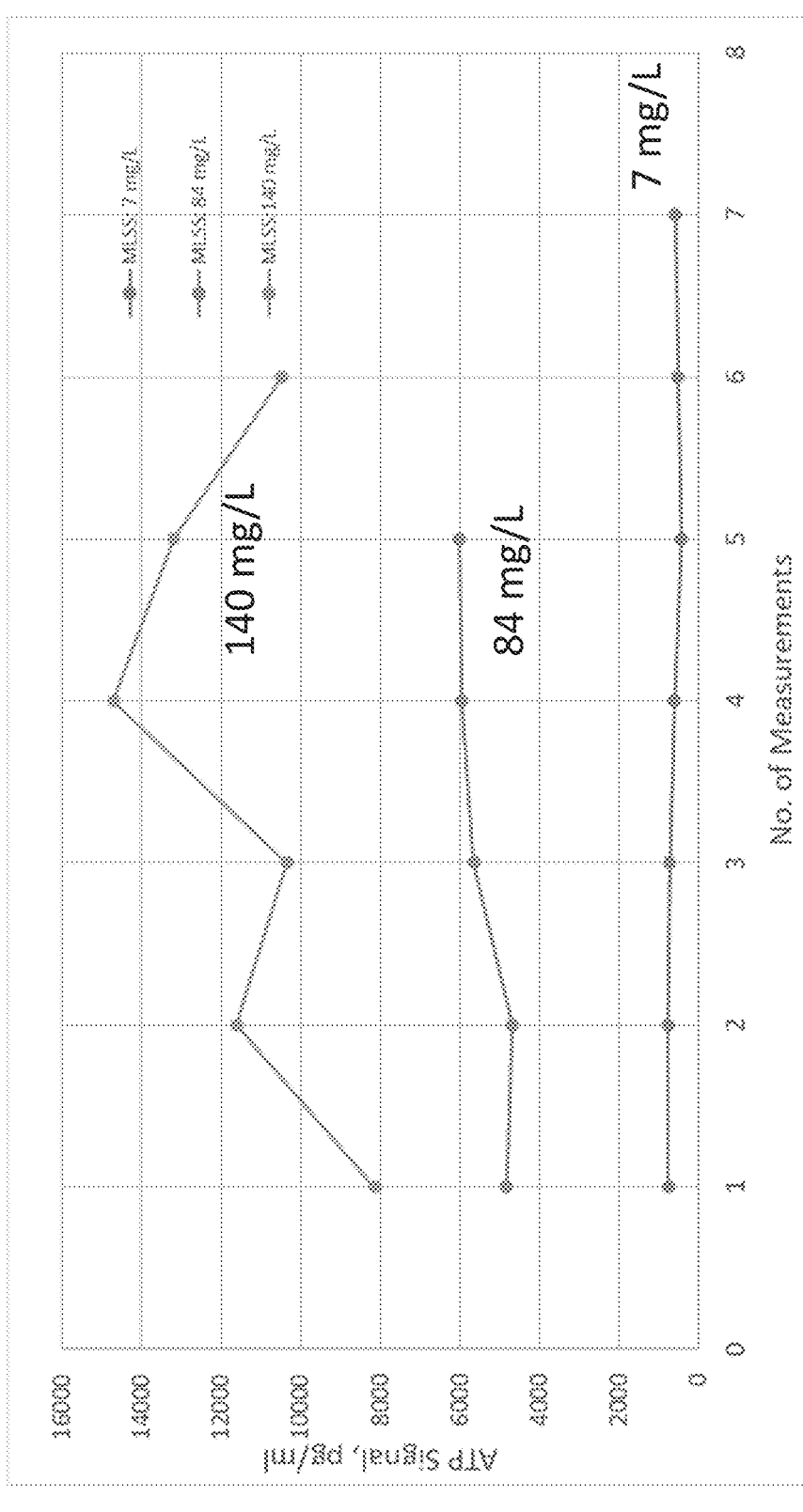
FIG. 8. ATP Concentrations of Various Mixed Liquor Suspended Solids

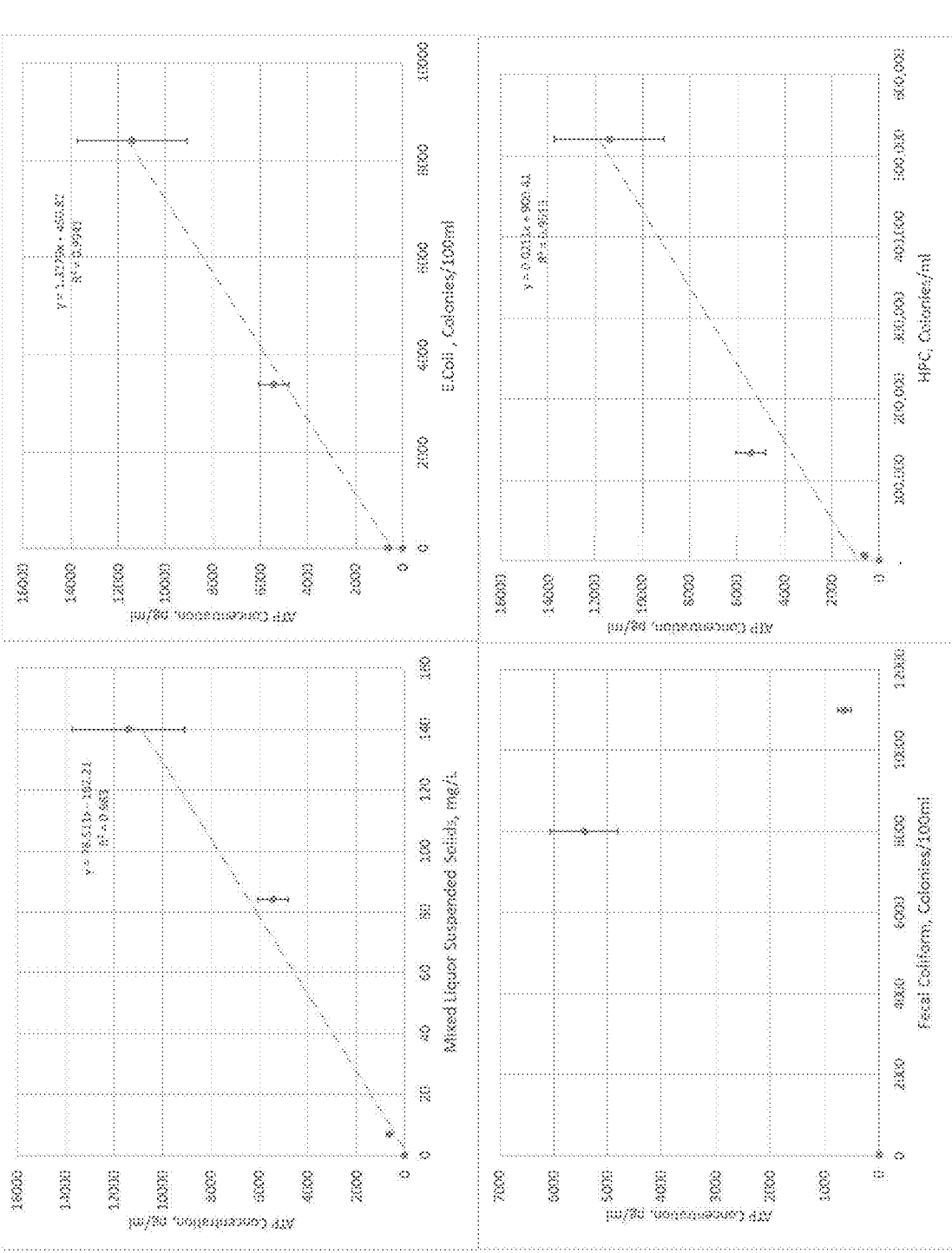
FIG. 9. Correlation between Mixed Liquor Suspended Solids and ATP Concentration

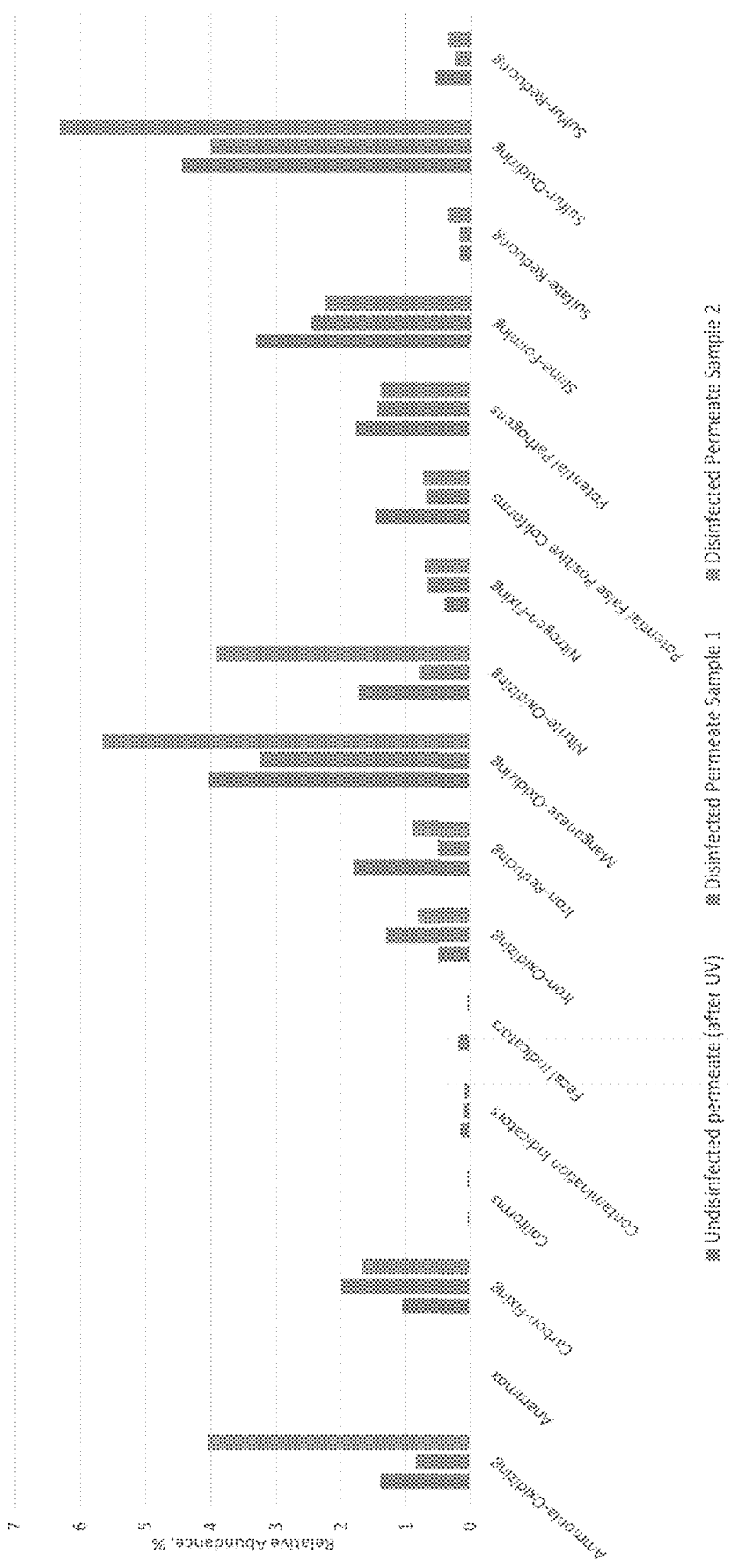
FIG. 10. 16NGS analysis of undisinfected and disinfected permeate samples

1

ONLINE BIOLOGICAL MONITORING IN DECENTRALIZED NON-POTABLE WATER SYSTEM

CROSS-REFERENCE TO RELATED APPLICATION

This application claims priority to U.S. Provisional Patent Application Ser. No. 63/210,915, filed on Jun. 15, 2021 and titled "ONLINE BIOLOGICAL MONITORING IN DECENTRALIZED NON-POTABLE WATER SYSTEM," the entire disclosure of which is hereby incorporated herein by reference in its entirety for all purposes.

FIELD OF THE TECHNOLOGY

One or more aspects relate generally to water reuse and, more particularly, to systems and methods for online biological monitoring in decentralized non-potable water reuse systems.

BACKGROUND

Facing the increasing pressure from droughts and water scarcities, seeking alternative water sources has been of growing interest across the United States for the past decades. Decentralized non-potable water systems (DNWS) have become one of many solutions that can help society reclaim, recycle, and reuse water for non-drinking purposes. DNWS utilize local water sources (e.g. rainwater, stormwater, foundation drainage, graywater, and blackwater), treat the wastewater locally or onsite, and reuse the treated water to meet the demands for non-potable water (e.g. toilet flush, irrigation, cooling tower makeup, and laundry). The benefits that DNWS can provide to the communities have been demonstrated in multiple projects across the nation, especially in large cities like San Francisco and New York City. Several residential towers in Manhattan, for example, have demonstrated the ability to reduce potable water consumption and sewer discharge by up to 50% using onsite DNWSs. This strategy reduces strain on city regional water supply and sewerage infrastructure and provides a resilient source of water.

As DNWS become a vital part of diversifying the water sources and providing resiliency to the existing water supply system, the quality of the produced water must be regulated in order to adequately protect the public health. Multiple federal, state and local organizations have provided guidelines and/or regulations for designing, permitting, constructing, operating, and managing of the DNWS to ensure the public health.

SUMMARY

In accordance with one or more aspects, a method for online biological monitoring in a decentralized non-potable water reuse system is disclosed. The method may include accessing a wastewater treatment system of the decentralized non-potable water reuse system and performing online monitoring of a total biological count associated with treated water produced by the wastewater treatment system.

In some aspects, at least one of a dissolved adenosine triphosphate (dATP), a cellular ATP (cATP) and/or a total ATP (tATP) concentration of the treated water is monitored. Treated water may be sampled downstream of a disinfection process for online monitoring. Multiple samples of treated water may be collected and analyzed per day.

The method may further involve comparing the monitored concentration to a predetermined threshold level. A notification may be provided to a system operator if the monitored concentration exceeds the predetermined threshold level. The method may further comprise performing a non-biological water quality measurement, e.g. turbidity or percent solids. The method may further comprise performing a culture-based test, e.g. total coliform, fecal coliform, *E. coli*, or heterotrophic plate count (HPC), periodically for validation and/or in response to a deviation from the predetermined threshold level.

In some aspects, the method may further comprise correlating the monitored total biological count to at least one of: treated water quality, wastewater treatment energy efficiency, membrane filtration performance, disinfection effectiveness, and bacterial regrowth in pipes and/or storage tanks. A preventative or corrective action may be taken in response to the monitored total biological count exceeding a predetermined threshold level. The method may further comprise bypassing the decentralized non-potable water reuse system to a potable mode of operation while the preventative or corrective action is taken.

In some aspects, the method may further comprise transferring thermal energy to an onsite heat pump to recover thermal energy, and delivering at least a portion of the recovered thermal energy to an onsite energy demand. Treated water may be delivered for one or more non-potable applications, e.g. toilet flush, irrigation, laundry, and cooling tower makeup.

In accordance with one or more aspects, a system is disclosed. The system may include a decentralized non-potable water reuse system including a wastewater treatment system, and an online analyzer constructed and arranged to monitor a total biological count associated with treated water produced by the wastewater treatment system.

In some aspects, the online analyzer may monitor at least one of a dissolved adenosine triphosphate (dATP), a cellular ATP (cATP) and/or a total ATP (tATP) concentration of the treated water. The online analyzer may be in communication with a control system configured to provide a notification to a system operator if the monitored concentration exceeds the predetermined threshold level. The control system may be further configured to perform a preventative or corrective action in response to the monitored concentration exceeding the predetermined threshold level.

In some aspects, the wastewater treatment system may comprise at least one of a: flow equalization tank, a primary settling unit operation, a biological treatment unit operation, a filtration unit operation, e.g micro- and/or ultrafiltration membrane filtration, a disinfection unit operation, e.g. ozone and/or UV, and treated water storage.

In some aspects, the system may further include a heat pump configured to deliver thermal energy to an onsite energy demand, and a heat exchanger, proximate to and in thermal communication with the onsite wastewater treatment system and the heat pump, the heat exchanger configured to convey thermal energy to the heat pump.

In accordance with one or more aspects, a method of retrofitting a decentralized non-potable water reuse system is disclosed. The method may involve installing an online biological analyzer downstream of a wastewater treatment system and upstream of a point of use in the decentralized non-potable water reuse system, the online biological analyzer constructed and arranged to monitor a total biological count associated with treated water produced by the wastewater treatment system, and interconnecting the online biological analyzer with a controller configured to perform a preventative or corrective action in response to the monitored total biological count exceeding a predetermined threshold level.

In some aspects, the online biological analyzer monitors at least one of a dissolved adenosine triphosphate (dATP), a cellular ATP (cATP) and/or a total ATP (tATP) concentration of the treated water. The online biological analyzer may sample the treated water multiple times per day.

In at least some aspects, the method may further comprise installing an onsite heat pump to recover thermal energy for delivery to an onsite energy demand.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosed embodiments, and are not intended as a definition of the limits of such embodiments. For purposes of clarity, not every component may be labeled in every drawing. In the following description, various embodiments are described with reference to the following drawings, in which:

FIG. 4 presents a schematic of an external heat exchanger in accordance with one or more embodiments;

FIG. 5 presents a schematic of an internal heat exchanger in accordance with one or more embodiments;

FIGS. 7-10 present data with reference to the Example in accordance with one or more embodiments.

DETAILED DESCRIPTION

Figure 1:
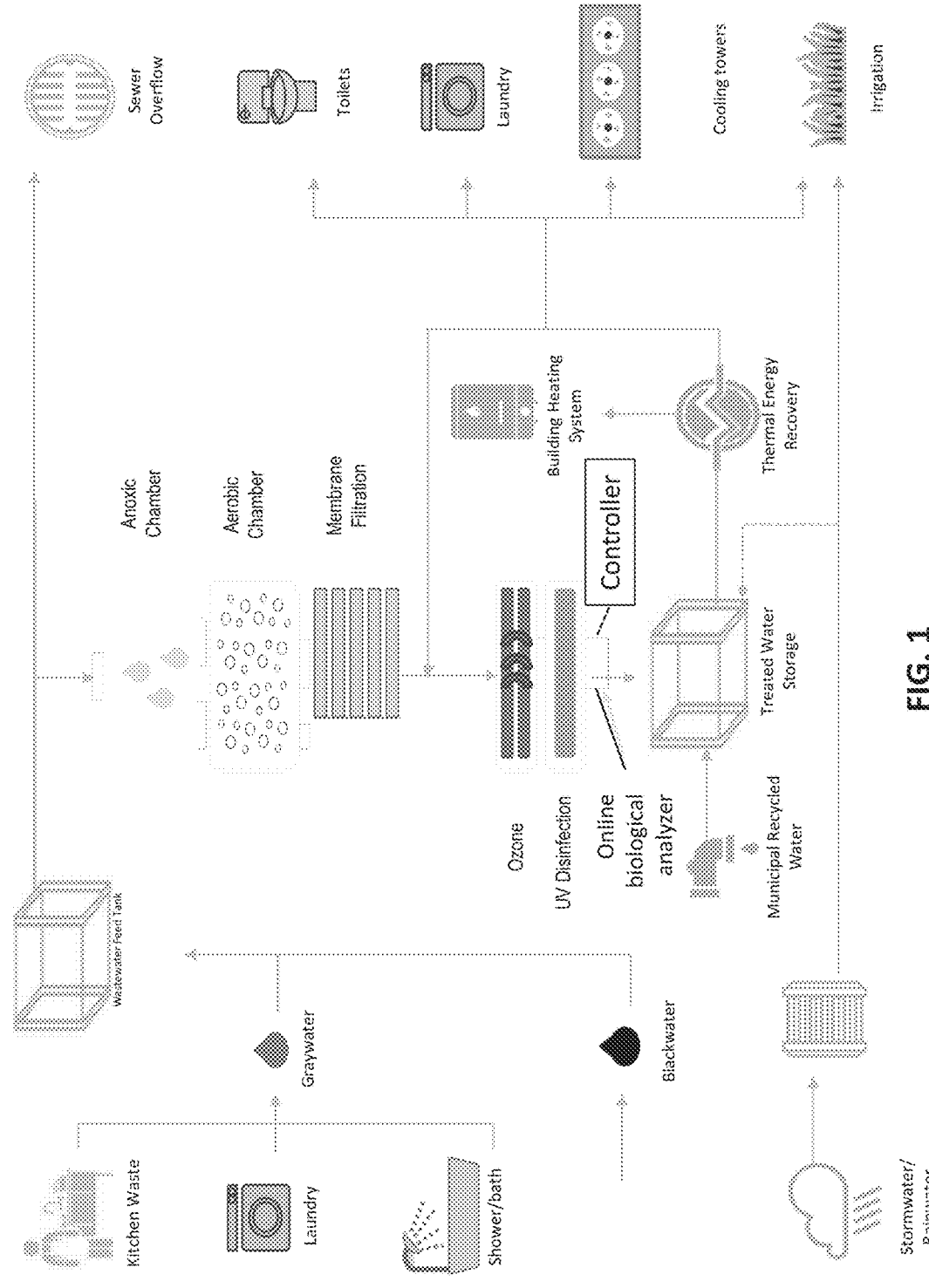
FIG. 1 presents a schematic of a system including an online biological count analyzer in accordance with one or more embodiments.

As an important part of the production of safe reuse water for public use, monitoring the water quality, especially pathogens that potentially pose risks to human health, is strictly regulated by federal (e.g. EPA), state, and local (e.g. municipal) authorities. Commonly, total coliform, fecal coliform, and *E. coli* are used as indicators of other pathogens existing in reuse water. However, long turnaround time of results from these culture-based tests may lead to a miss of the first opportunity of capturing and reacting to the system compromise when it happens. Moreover, conditions which require frequent sampling and testing (e.g. daily) can become labor intensive and cost prohibitive, which increases the financial burden to utility owners. Alternative techniques that can implement the fast and reliable microbial detection in reuse water are disclosed herein.

In accordance with one or more embodiments, disclosed systems and methods improve public health and facilitate compliance with various regulatory requirements associated with reuse water. Speed of action in terms of testing, as well as in terms of implementing preventative and/or corrective actions may be increased. Multiple samples per day may be reliably tested for improved water quality monitoring that provides information regarding total microbiological population in comparison to conventional culture-based testing. Quantitative microbial risk assessment (QMRA) for more sources of water supply and treatment processes may be expanded. Early and immediate detection of membrane filtration and other potential system failures may be enabled. Pathogen regrowth and control issues in distribution and storage systems may be implemented. Surrogate pathogen detection and system control may be automated. Data trending can provide a basis for informed decision making in terms of optimizing system maintenance, for example, frequency of cleaning and/or flushing of a distribution system. Related protocols for commissioning, verification and challenge testing may be developed and implemented for quality control. Beneficially, the energy consumption of disinfection and/or other unit operations in a water treatment system may be optimized. Operation and labor expenses associated with manual sampling may also be reduced via automatic sampling, measuring and reporting of microbial analysis.

Various embodiments described herein are not limited in their application to the details of construction and the arrangement of components as set forth in the following description or illustrated in the drawings. One or more embodiments are capable of being practiced or carried out in various ways beyond those exemplarily presented herein.

In accordance with one or more embodiments, microbiological counts in non-potable water produced by a wastewater treatment system for reuse may be monitored. *E. Coli*, total coliform, and/or fecal coliforms are commonly used as the indicators of microbiological contamination in treated water. For onsite wastewater reuse systems, some regulations require a daily manual sample of *E. Coli*, total coliform, and/or fecal coliform in order to monitor the quality of the reuse water. The results of these tests are not available for days and such monitoring can be labor intensive and cost prohibitive. In some embodiments disclosed herein, an online biological analyzer may beneficially be implemented. Through online monitoring, samples can be collected automatically at a much higher frequency compared to manual tests, while reducing overall labor requirements. Results can also be monitored remotely and are available to the entire team immediately after a measurement is performed. In some embodiments, online water quality measurements may focus on monitoring turbidity and/or microbial levels.

In accordance with one or more embodiments, an online analyzer constructed and arranged to monitor a total biological count associated with treated water produced by a wastewater treatment system may be implemented. The online analyzer may be a biological analyzer. In some specific non-limiting embodiments, the water reuse system may include an online ATP analyzer. ATP is considered the primary energy carrier for all life forms and can be found only in and around living cells. Consequently, the measurement of the ATP concentration in a sample can provide a direct measurement of biological concentration and health. ATP concentrations may reliably respond to a breakdown or change in the wastewater treatment process (e.g. detection of a membrane failure). ATP testing provides several advantages over traditional *E. Coli*, total coliform, and/or fecal coliform culture-based tests. Notably, results are available frequently and within minutes (e.g. in under eight minutes) rather than after hours or days. The test is resistant to interferences from disinfectant residual, and ATP testing provides a measurement of total biological content, not just culturable microorganisms. Thus, testing and monitoring may provide an indication of bacterial load, viral load and/or load of other types of microorganisms.

In accordance with one or more embodiments, at least one of a dissolved adenosine triphosphate (dATP), a cellular ATP (cATP) and/or a total ATP (tATP) concentration of the treated water is monitored. In at least some embodiments, the ATP analyzer may be a BugCount® online ATP analyzer commercially available from LuminUltra Technologies, Ltd. (Canada) in which ATP is quantified by measuring the light produced through its reaction with the naturally-occurring firefly enzyme Luciferase using a Luminometer with the amount of light produced being directly proportional to the amount of ATP present in the sample.

In accordance with one or more embodiments, the online ATP analyzer may be installed downstream of the wastewater treatment system. In some embodiments, the online ATP analyzer may be setup in a flow-through configuration at an outlet or discharge of the wastewater treatment system. For example, in embodiments involving an ozone and/or UV treatment system, flow to the ATP analyzer may be sampled from the discharge of the ozone and/or UV system. In another example, flow to the ATP analyzer may be sampled downstream of a membrane (e.g. microfiltration or ultrafiltration) unit operation. In other embodiments, reuse water quality may be monitored at the point of reuse, e.g. at the point of a cooling tower, to indicate any bacteria growth in a building's non-potable water distribution system.

Upstream, monitoring may provide an indication of biological quality and quantity in various process tanks. Downstream, monitoring may provide an indication of biological quality and quantity in reuse storage tanks and/or distribution piping. At points of reuse, monitoring may provide an indication of biological quality at various applications, for example, cooling tower inlets.

Sampling and testing may be automatic. In accordance with one or more embodiments, the online biological analyzer may sample continuously or periodically. Testing may also be continuous or periodic. Periodic testing may be at predetermined intervals so as to sample and test a predetermined number of times per day. In at least some embodiments, treated water may continuously flow through the analyzer for sampling and be sent to drain. In other embodiments, a direct sampling configuration with a standardized frequency may be selected.

In accordance with one or more embodiments, a correlation between online biological monitoring results and culture-based biological test results may be established. Site specific baseline signal(s) under normal operational conditions and parameter level(s), e.g. ATP action levels, may be established to indicate when the wastewater treatment system is operating effectively, or when preventative or corrective actions are required. In some embodiments, action levels may relate to federal, state and/or local regulations. An ATP signal may be correlated to an ATP concentration which, in turn, may be correlated to mixed liquor suspended solids or other operational parameter. Deviations relative to baseline may be flagged.

In accordance with one or more embodiments, the online biological analyzer may be coupled to an online platform for automatic sampling, measuring and reporting of microbial analysis. In at least some embodiments, an alarm may be associated with deviations exceeding a threshold level. Data may be collected and recorded. Data may be stored in the cloud. The monitored total biological count may be correlated to at least one of: treated water quality, wastewater treatment energy efficiency, membrane filtration performance, disinfection effectiveness, and bacterial regrowth in pipes and/or storage tanks. In some specific embodiments, data may be used as an indicator of bacteria regrowth in process piping and/or treated water storage tanks.

One or more actions may be implemented responsive to the data including system maintenance and/or cleaning. A controller may be coupled to the biological analyzer and/or other sensors. In some embodiments, the controller may be local to an operations team and may include a user interface. In some embodiments, the controller may be cloud-based and data may be transmitted to the cloud-based controller. The controller may be a treatment plant control panel. In some embodiments, the controller may be a DNWS control panel. The controller may monitor data and evaluate related trends. Responsive to data collected from the sensors, the controller may determine whether any preventative or corrective action is required. Preventative action may include membrane cleaning, tank cleaning, pipe cleaning or other system maintenance. The controller may issue one or more control signals to one or more system components such as various valves accordingly. In some embodiments, disinfection via UV intensity and/or ozone dose may be adjusted. In other embodiments, flow rate and/or residence time in a unit operation may be adjusted. In still other embodiments, dose of a chemical feed, such as chlorine or oxidant addition, may be adjusted. In some embodiments, the decentralized non-potable water reuse system may be temporarily bypassed to a potable mode of operation while the preventative or corrective action is taken.

In some embodiments, monitoring may beneficially provide insight into various trends such that preventative or corrective action may be taken in advance of a performance failure and/or a breakthrough detection. A baseline may be established and correlations with reference to baseline may facilitate monitoring. For example, a spike over baseline may be indicative of a new problem or regrowth. Sampling from one or more locations may help isolate the source of a problem, for example, downstream of disinfection and upstream of a point of use, or in piping or storage associated with a point of use.

In at least some embodiments, the ATP analyzer may supplement and/or replace a daily sampling protocol. A culture-based test, e.g. total coliform, fecal coliform, *E. coli*, or heterotrophic plate count (HPC), may be performed periodically for validation and/or in response to a deviation from the predetermined threshold level. In other embodiments, no culture-based testing is performed.

In some embodiments, the online analyzer and/or additional system sensor may monitor one or more further water quality characteristics or parameters including pH, temperature, turbidity and/or percent solids. The controller may be in communication with any such additional sensors. The online analyzer may have a user interface to facilitate monitoring and reporting, onsite and/or cloud-based. The online analyzer may be integrated into a closed or open loop system.

In accordance with one or more embodiments, a decentralized non-potable water reuse system may be retrofitted. An online biological analyzer may be installed downstream of a wastewater treatment system and upstream of a point of use in the decentralized non-potable water reuse system. The online biological analyzer may be constructed and arranged to monitor a total biological count associated with treated water produced by the wastewater treatment system. In some embodiments, the online biological analyzer may be integrated with a controller configured to perform a preventative or corrective action in response to the monitored total biological count exceeding a predetermined threshold level. The online biological analyzer may sample the treated water multiple times per day for monitoring.

FIG. 1 presents a schematic of a decentralized non-potable water reuse system and method in accordance with various embodiments. Wastewater is collected, stored, and treated locally on a scale of individual dwellings, industrial or institutional facilities, clusters of homes or businesses, and/or entire communities. Graywater may be collected from various onsite sources including kitchen waste, laundry and shower/bath. Blackwater may also be introduced to a wastewater feed tank. The reuse system may include a wastewater treatment system including primary, secondary, and advanced wastewater treatment processes. In some embodiments, the wastewater treatment system may include one or more of a flow equalization tank, a primary settling unit operation, a biological treatment unit operation, e.g. anoxic and/or aerobic, a filtration unit operation, e.g micro- and/or ultrafiltration membrane filtration, a disinfection unit operation, e.g. ozone and/or UV, and treated water storage. Biological monitoring may be performed downstream of the wastewater treatment system as described above. Treated water may be delivered for one or more non-potable applications, e.g. toilet flush, irrigation, laundry, and cooling tower makeup. The reuse water may be supplemented, such as with storm/rainwater and/or municipal water. Optionally, thermal energy recovery may be performed as discussed further herein. The analyzer may be in communication with a controller which may, in turn, provide control signals to various components of the wastewater treatment system and/or overall water reuse system to adjust one or more operational parameters. Some non-limiting lines of communication are illustrated by way of example only. In general, cross-contamination within the system is undesirable and to be avoided.

In accordance with one or more embodiments, heat energy contained in fluids may be a useful energy source and may beneficially be captured for use rather than lost to the environment. One source of heat energy that has previously been unexploited is the heat energy contained in wastewater. Wastewater may often be heated as a result of the application for which it was used. For example, household, industrial, or office wastewater may be at an elevated temperature as a result of its use in cooking, washing, or cleaning. However, as the wastewater travels through piping, it is reduced to ambient temperature, and its heat energy is rendered unrecoverable. Such heat energy may instead be harvested and used in accordance with one or more embodiments disclosed herein.

In accordance with one or more embodiments, energy recovery operations may be coupled to a water source to enhance overall efficiency. In some embodiments, the water source may be a wastewater treatment and reuse system, discussed below. Implementation of the system integration discussed herein may allow for the recovery of energy from the source of water and its delivery for other demands, including onsite demands.

In accordance with one or more embodiments, implementation of onsite wastewater treatment and reuse may help to reduce potable water demand as well as relieve sewerage infrastructure. DNWS may capture and treat wastewater at the point of production, for reuses, including without limitation toilet flushing, building cooling and irrigation. Use of this technology has previously been limited, however, by economic and energy concerns, due to their higher operational cost and energy consumption in comparison to conventional wastewater treatment systems.

In accordance with one or more embodiments, wider adoption of DNWS technology may contribute to a reduced strain on existing potable water infrastructure, conserving large amounts of potable water. Furthermore, reduced sewer discharges may alleviate strain on existing infrastructure, reduce susceptibility to SSOs during storm events, and reduce the quantity of nitrogen and phosphorus discharged to the local utility and/or the environment.

In accordance with one or more embodiments, energy recovery operations may be coupled to onsite DNWS to enhance overall efficiency. The DNWS may be located onsite to service a residential building, a commercial space, an industrial space or other structure. A single DNWS may service multiple buildings in close proximity. In some embodiments, energy may be harvested from the wastewater treated by a DNWS. Implementation may allow for the recovery of energy from the wastewater and its delivery for other onsite demands. For example, recovered thermal energy may facilitate onsite space and water heating. In some embodiments, recovered thermal energy may be converted to another form of energy, such as mechanical or electrical energy. Such energy may be used for various onsite demands, including operation of a DNWS. Thus, energy recovered from wastewater may be used to drive its treatment. Treated water may then be delivered to non-potable and/or potable points of use, onsite or offsite. In at least some embodiments, the incorporation of energy recovery operations into a DNWS may make onsite wastewater treatment and reuse systems net energy producers.

In accordance with one or more embodiments, a heat pump may be incorporated into an onsite DNWS. Different types of heat pumps may be implemented. In some non-limiting embodiments, an absorption cycle water source heat pump may be used. An absorption-type heat pump may use ammonia as a refrigerant, which has zero ozone depletion potential and, unlike R410a, has zero global warming potential. The absorption heat pump may be adapted in such a way as to reduce the lengths of required heat transfer loops normally associated with their use in connection with surface water bodies or groundwater. In other non-limiting embodiments, a compression-type heat pump may be used.

One gallon of water accumulates approximately 100 BTU of embodied energy over its life-cycle. A majority of the embodied energy is generally gained by sensible heating. By the time wastewater discharged to municipal sewer networks arrives at wastewater treatment plants, much of this thermal energy has dissipated to the surroundings. Incorporating a heat pump into a DNWS in accordance with one or more embodiments may allow for the recovery of heat from discharged wastewater by capturing that heat close to the point of production for redistribution at an in-building, block, or small district scale.

In at least some embodiments, useful thermal energy from treated wastewater may then be transferred to in-building, or nearby heating demands, such as, for example, domestic hot water heaters or space heating systems. Enhancing a DNWS with a heat pump to transfer thermal energy from highly treated reuse water to in-building space and water heating demands, as well as cooling demands, may improve the economic and energy profile of the DNWS, and therefore increase the feasibility of performing onsite water reuse. This strategy simultaneously provides energy and water resiliency at the building scale. Wastewater generally contains more thermal energy than is required to treat it. Thus, onsite wastewater treatment for the production of reuse water may be an energy positive process in accordance with one or more embodiments.

In accordance with one or more embodiments, a heat pump may be coupled at various stages along the DNWS as discussed below in connection with FIG. 1. In at least some embodiments, the location of a heat pump adjacent to an onsite DNWS may beneficially reduce the lengths of required heat transfer loops and improve heat transfer performance.

Figure 2A:
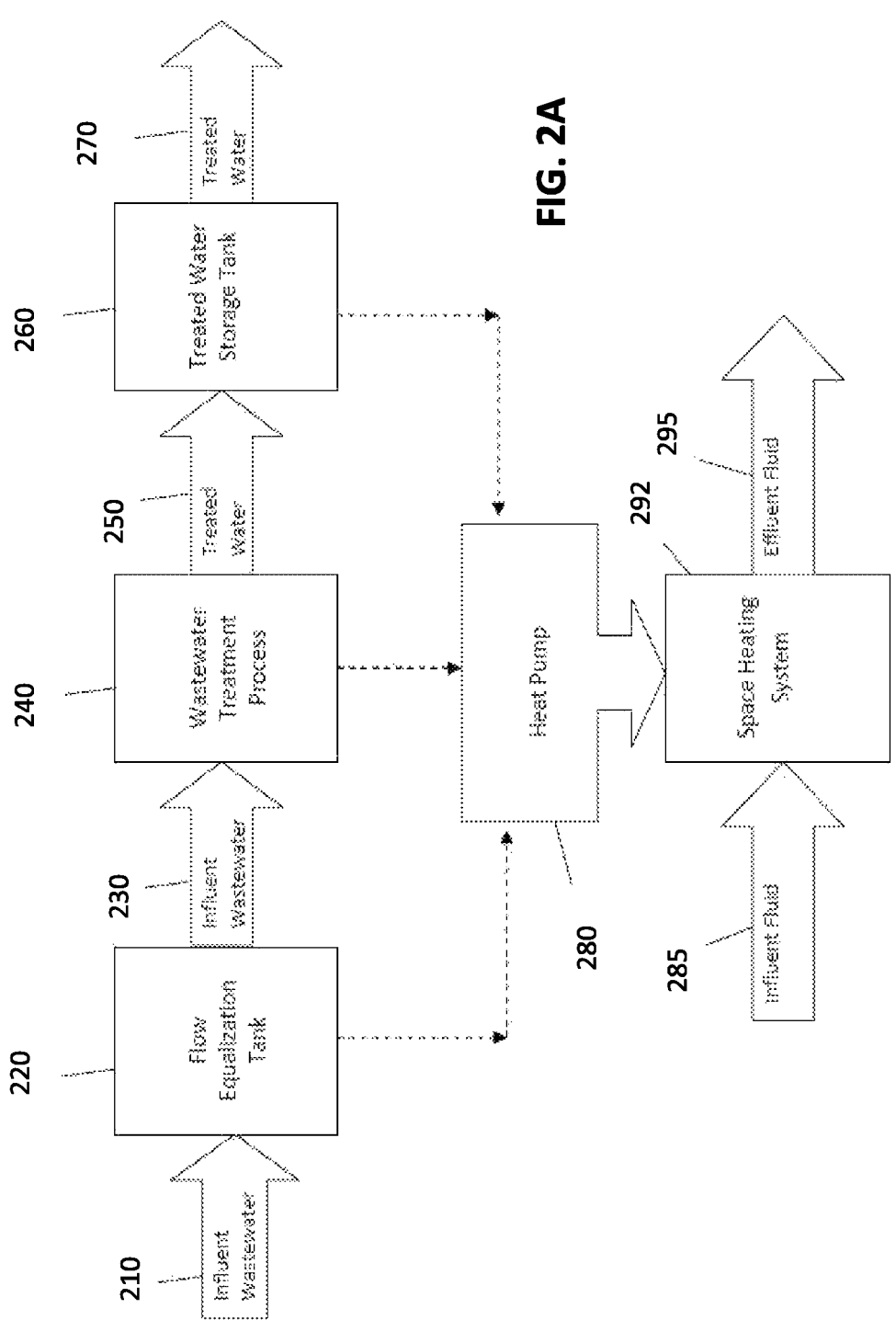
FIG. 2A presents a schematic of an onsite water treatment and energy recovery process in accordance with one or more embodiments.

A schematic of an onsite water treatment and energy recovery process in accordance with one or more embodiments is presented in FIG. 2A. Influent wastewater 210 may enter a flow equalization tank 220. The influent wastewater 210 may be local wastewater. For example, it may be wastewater 210 produced by activity in a building where the wastewater treatment process 240 is located, or produced near where the wastewater treatment process is located such as within a few city blocks. The building or buildings producing the wastewater may be residential buildings in some non-limiting embodiments. The influent wastewater 210 may be produced by residential activity, for example, clothes washing, dishwashing, showering and toilet use. The influent wastewater 210 may be heated wastewater resulting from residential, commercial, or industrial uses of hot water. In some non-limiting embodiments, the temperature of the influent wastewater 210 may range from about 5° C. to about 50° C. depending on the time of the year. A typical temperature range of the influent wastewater may be from about 20° C. to about 30° C. in some non-limiting embodiments.

An equalization tank or series of tanks 220 may be employed downstream of the initial influent wastewater 210 to create a uniform flow for further downstream processes. Equalized influent wastewater 230 leaves the flow equalization tank 220 and enters the water treatment process 240. The water treatment process may include one or more of various unit operations known to those skilled in the art. In some embodiments, the water treatment process 240 may comprise a membrane bioreactor. The water treatment process 240 is discussed in greater detail below in association with FIG. 3. According to some non-limiting embodiments, the water treatment process 240 may treat waste to produce "reuse water"—non-potable water fit for other household or non-residential commercial, institutional or industrial purposes. The treated water 250 may then be transferred to a storage tank 260, or series of storage tanks, to await demand for use. The treated water 270 may then leave the storage tank 260 and be sent to a potable or non-potable point of use in accordance with one or more embodiments.

Because the wastewater was produced onsite or in the proximity of the water treatment system, it may still contain substantial heat energy prior, during or subsequent to treatment, for example, hot shower water. Along the process, for example, at the flow equalization tank 220, the wastewater treatment process 240, or the treated water storage tank 260, the thermal energy from the wastewater or treated water may be transferred to aid the operation of a heat pump 280. In some embodiments, it is preferred that the heat pump 280 be in thermal communication with the treated water storage tank 260 because of the complications involved in operating the heat exchange portion of the heat pump in the presence of untreated wastewater.

The heat pump 280 may, for example, be an absorption heat pump. In an absorption heat pump, heat from a water source, such as the wastewater 210 or 230 or treated water 250 or 270, is transferred to a circulating fluid within the heat pump, for example ammonia, to evaporate the circulating fluid. The heat captured in the circulating fluid may then be utilized for various onsite uses, such as to aid a space heating system 292, or alternatively an air conditioning system. Where the heat pump 280 is used to provide heat for a space heating system 290, the influent fluid 285 may be cool air. The effluent fluid 295 that leaves the space heating system 290 may be heated air. In some embodiments, up to 100% of thermal energy previously added to wastewater 210 or 230 by earlier water heating steps may be recovered by a heat pump 280, for example, an absorption heat pump, and returned to the space heating system 290. A typical percent recovery range may be from 30% to 70% in some embodiments.

In accordance with one or more embodiments, a cold side of a heat pump may be used to provide onsite cooling and a hot side of the heat pump may be used to provide onsite heating. Heat exchangers may generally be liquid to liquid, liquid to gas, or gas to gas. In some embodiments, a heat exchanger may be positioned within a water storage or process tank, as shown in FIG. 5. In other embodiments, including select retrofit applications, liquid may be circulated to and from a heat exchanger from a water storage or process tank, as shown in FIG. 4. The transfer of thermal energy to and from a heat pump is described in further detail below with reference to FIGS. 4 and 5.

Figure 2B:
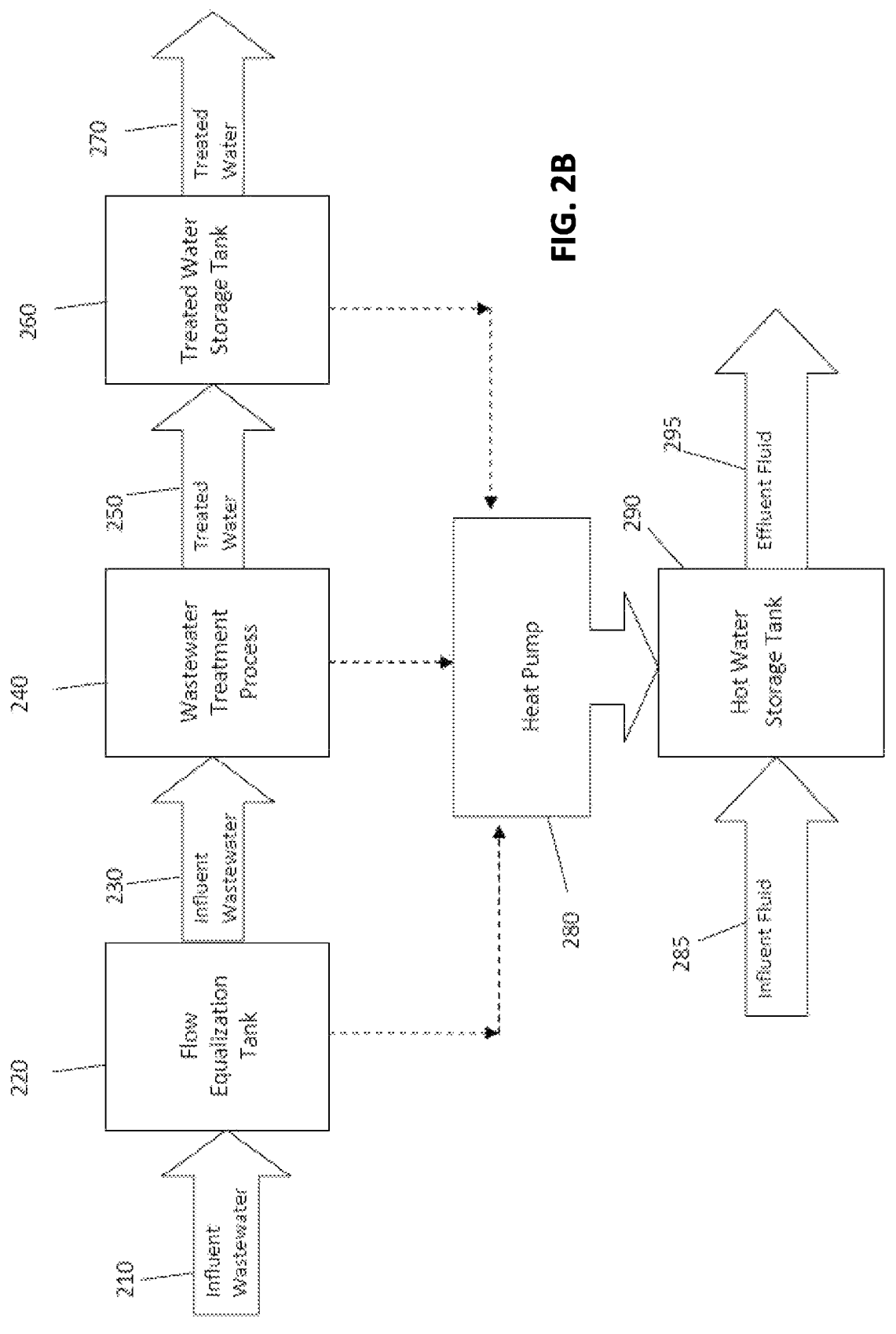
FIG. 2B presents a schematic of an onsite water treatment and energy recovery process in accordance with one or more embodiments.

Another schematic of an onsite water treatment and energy recovery process in accordance with one or more embodiments is presented in FIG. 2B. The schematic of FIG. 2B is similar to that of FIG. 2A except the heat pump 280 is utilized to contribute heat to a hot water storage tank 290, where the influent fluid 285 is cooler water and the effluent fluid 295 is warm water.

Figure 3:
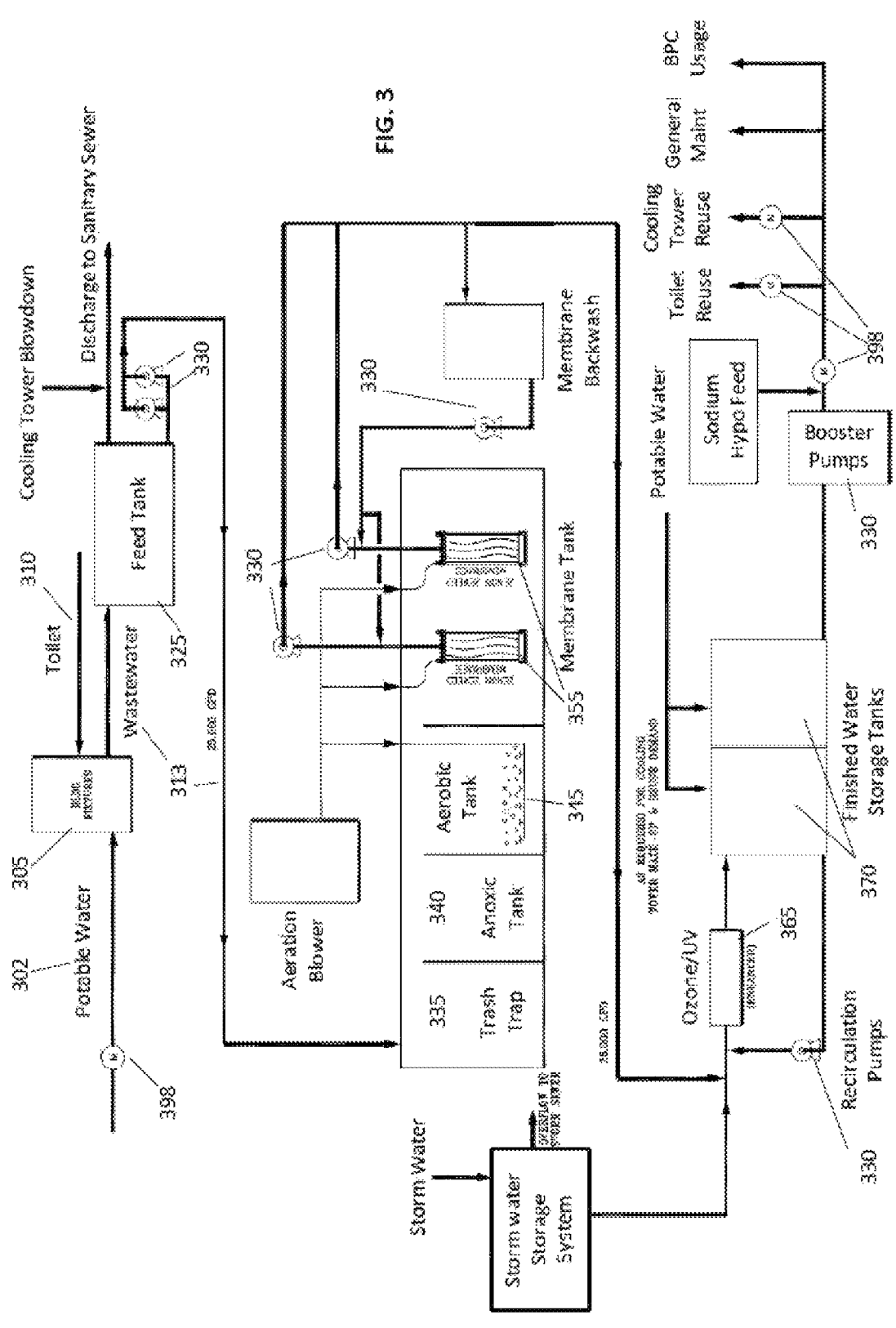
FIG. 3 presents a detailed schematic of an onsite water treatment and reuse system in accordance with one or more embodiments.

A detailed schematic of an onsite water treatment and reuse system in accordance with one or more embodiments is presented in FIG. 3. Potable water 302 along with reused/recycled water 310 may be introduced to building fixtures 305 and becomes wastewater 313. The wastewater 313 may then be fed to a feed tank or flow equalization tank 325. It may then be pumped 330 to a wastewater treatment system. In some non-limiting embodiments, the wastewater treatment system is a membrane bioreactor (MBR) system. The MBR may comprise a trash trap 335 for removing large debris, an anoxic tank 340 and aerobic tank 345 to treat the waste by introducing it to a biological profile. The wastewater is then passed through membranes 355 to further filter out impurities. It may also be treated by ultraviolet radiation 365. When treatment is complete the treated water may be stored in storage tanks 370 to await reuse. While the embodiment described in FIG. 3 includes an MBR system, other types of wastewater treatment systems commonly known to those skilled in the art may be implemented, including non-membrane treatment systems and various techniques for soluble contaminant removal.

The heat pump (not pictured) may be placed at various locations of FIG. 3. For example it may be in communication with the water at feed tank 325 or at storage tanks 370.

A schematic of an external heat exchanger in accordance with one or more embodiments is presented in FIG. 4. External heat exchanger system 400 facilitates the transfer of heat from warm process fluid 450 to produce a warm effluent 480 through implementation of a first heat exchanger 430 external to the process tank 410. Such a configuration may be preferable when retrofitting a building.

The process tank 410 may encompass any tank or combination of tanks, or series of pipes or combinations thereof, along the water treatment and storage train described above in connection with FIGS. 1-3. The process tank 410 may be, for example, a flow equalization tank, a treatment process tank, or a treated water storage tank. Furthermore, process tank 410 may be, for example, a series of treated water storage tanks. For example, warm fluid 450 may be delivered from a first treated water storage tank, while cool fluid 460 is returned to a second treated storage water tank. According to another embodiment, treated water 150 may be delivered to and/or recycled through heat exchanger 430 and returned to a storage tank. Various other combinations in accordance with the above description will be understood by a person of ordinary skill in the art in light of this specification.

Warm fluid 450 from process tank 410 may then be transferred out of process tank 410 and into an external heat exchanger 430. In external heat exchanger 430, thermal energy from the warm fluid 450 may then be transferred to a refrigerant, e.g. ammonia, or a refrigerant-laden liquid of the heat pump 420. Thermal energy from the heat pump 420 may then be transferred to a cold influent 470 via a second heat exchanger 440 to produce or aid in the production of a warm effluent 480. Warm effluent 480 may then be applied to various uses and thermal demands.

In an alternative non-limiting configuration, a schematic of an internal heat exchanger in accordance with or more embodiments is presented in FIG. 5. In the internal heat exchanger system 500, the heat exchanger is integrated into process tank 510, such that thermal energy is transferred from the warm process fluid while the process fluid is in process tank 510.

As with process tank 410 described above, process tank 510 may encompass any tank or combination of tanks, or series of pipes or combinations thereof, as described with reference to FIGS. 1-3 or throughout the specification.

Thermal energy may be transferred to a refrigerant or refrigerant-laden fluid of heat pump 520, via a heat exchanger embedded into process tank 510. The process tank 510 may comprise, without limitation, any of a flow equalization tank, a waste treatment tank, and a storage tank. The process tank 510, may be, for example a separations unit or a membrane bioreactor. Thermal energy from the heat pump 520 may then be transferred to a cold influent 540 via heat exchanger 530 to produce a warm effluent 550. Warm effluent 550 may then be applied to various uses and thermal demands.

Figure 6:
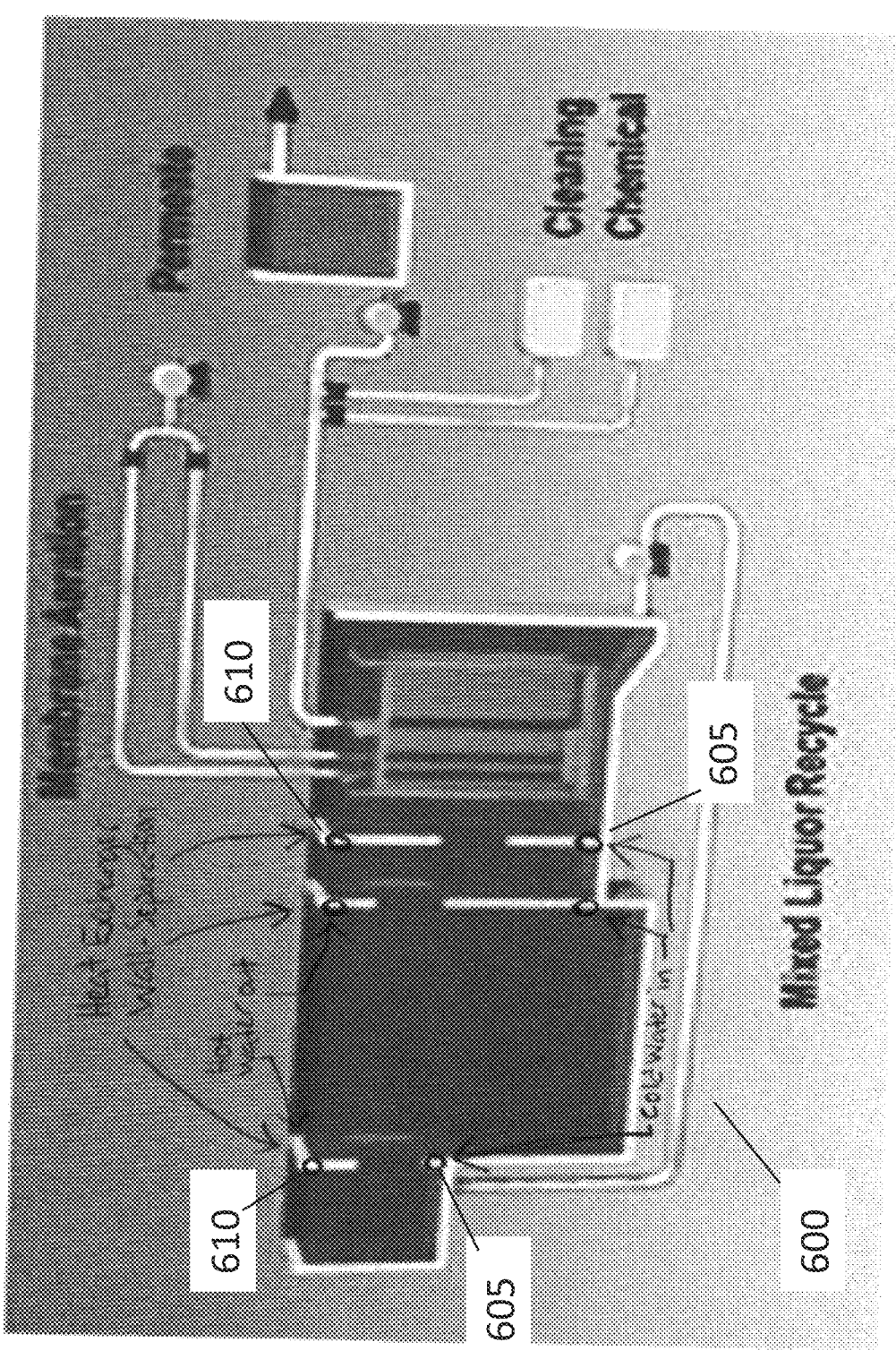
FIG. 6 presents a schematic of a heat exchanger integrated with a membrane bioreactor in accordance with one or more embodiments.

In accordance with one or more embodiments, a heat exchanger may be integrated into one or more components of the disclosed systems. For example, a heat exchanger integrated with an MBR in accordance with one or more embodiments is presented in FIG. 6. The structure of the MBR or other component into which a heat exchanger is to be integrated may generally dictate the overall design. It may generally be favorable that the integration be designed so as to promote heat exchange. In some embodiments, the heat exchanger may be integrated into the walls of the MBR or other component. Heat exchange piping 605 and 610 is integrated into a MBR 600. In the integrated MBR 600, the warm fluid within the reactor may function as the source side of the heat exchanger. Influent from the load side may enter through piping 605, and absorb heat from the reactor 600. The warmed fluid may then exit as effluent through piping 610 where it may go on to serve various functions. For example, the warmed fluid may serve as the source side for a heat pump. Alternatively, piping 605 and 610 may be piping of the heat pump itself. While a membrane bioreactor is shown, any unit operation, apparatus or storage tank could be integrated with a heat exchanger to serve the same function of delivering thermal energy through an integrated design in accordance with one or more embodiments.

In accordance with one or more embodiments, the DNWS and associated energy recovery system may service a single building or a group of buildings in close proximity. The recovered thermal energy may be augmented with heat from another source. In some embodiments, heat may be recovered from tanks used to treat the wastewater or store treated water. The tanks may be located inside the building, outside the building, or a mix of inside and outside. In other embodiments, thermal energy may be recovered from a flow equalization tank associated with the wastewater treatment system. In some embodiments, the heat pump may be integral to the DNWS. In other embodiments, the heat pump may be separate from the DNWS. In accordance with one or more embodiments, existing DNWS equipment may be retrofitted for energy extraction and its subsequent use.

In accordance with one or more embodiments, a system or method for recovering heat energy from wastewater may be implemented such as described in U.S. Pat. No. 9,719,704 which is hereby incorporated by reference in its entirety for all purposes.

In accordance with one or more embodiments, a process control system with sensors and output capabilities may be incorporated to monitor and operate the described components. In at least some embodiments, a thermal management system may efficiently accommodate thermal supply and demand. One or more storage tanks may facilitate such processes.

The embodiments described herein will be further illustrated through the following example which is illustrative in nature and not intended to limit the scope of the disclosure.

Example: Online ATP Analyzer

An online ATP analyzer (BugCount® Online ATP analyzer commercially available from LuminUltra Technologies, Ltd.) was installed downstream of UV disinfection as shown in FIG. 1 to continuously monitor the water quality by taking multiple samples per day. The flow through configuration was applied for sample collection. Samples were continuously measured to establish the baseline signal. Additional tests were conducted to study the analyzer's response upon challenging conditions.

Baseline Signal Establishment

The baseline signal of the online ATP analyzer was established under the normal operation conditions of the treatment system. A 4-hour interval was used between sample measurements. Upon the establishment of the baseline, signals that deviate from the baseline will be a direct indication of the change of water quality, which further indicates the change of the treatment system operation conditions. This helps the operation team detect the system failure in an early phase when preventive actions or corrective actions are required.

Challenge Test

Solids and biological organisms are retained within the treatment tanks by ultra-filtration membranes with a pore size of 0.01 um-0.05 um. Thus, verification of the integrity of ultra-filtration membranes is crucial to the production of high quality of reuse water. The direct integrity tests such as pressure decay test typically do not apply to low pressure submerged membranes. Continuous indirect integrity monitoring, turbidity, is commonly used to validate the integrity of the membranes. In this study, we conducted a series of challenge tests to mimic the breaching of the membranes and determined the corresponding responses from the online ATP analyzer. A total of three concentrations of activated sludge mixed liquor were prepared by mixing the disinfected permeate and activated sludge collected in the treatment tanks. The mixed liquor was delivered to the ATP analyzer via a peristaltic pump. Multiple measurements were taken under each concentration test to determine the average signal response.

Culture-Based Tests

Grab samples were collected from disinfected effluent in baseline collection period and each prepared concentration of the activated sludge mixed liquor in the challenge test. The collected samples were analyzed by a state certified testing lab:

| Parameters | Method |
|---|---|
| Fecal Coliform | SM 9222 D-06 |
| E. Coli | EPA 1603-14 |
| Heterotrophic Bacteria (HPC) | SM 9215 B-04 |
| Total Suspended Solids (TSS) | SM 2540 D-11 |

Results and Discussions

Baseline Signal Establishment

Baseline signal was collected at a 4-hour sample interval under the normal operation of the treatment system. FIG. 7 presents the ATP analzyer's signal (in terms of ATP concentration, pg/ml) from two baseline collection periods. 98% of the samples has an ATP concentration below the analzyer's detection limit. Only 2% of the samples has a detected ATP concentration ranging from 100 pg/ml to 250 pg/ml.

Grab samples of disinfected effluent were collected and microbiological parameters were analyzed by the certified testing lab:

| Parameters | Permeate Sample 1 | Permeate Sample 2 | Permeate Sample 3 | Permeate Sample 4 |
|---|---|---|---|---|
| Fecal Coliform, Colonies/100 ml | <1 | <1 | <1 | <1 |
| E. Coli, Colonies/100 ml | <1 | <1 | <1 | <1 |
| Heterotrophic Bacteria (HPC), CFU/ml | 95 | 160 | <30 | <30 |

The concentrations of Fecal Coliform and E. Coli from all grab samples are below method detection limits. The low level of HPC counts indicates the effluent was highly treated and disinfected for non-potable water applications.

Challenge Tests

Three concentrations of activated sludge mixed liquor suspended solids (MLSS) were prepared to simulate the beaching of the membrane structures. Each concentration of the mixed liquor was pumped into the ATP analyzer to determine the ATP concentrations. At least five ATP measurements were taken during each test. The ATP concentrations corresponding to three mixed liquor concentrations are plotted in the FIG. 8. The statistics of the results are as follows:

| Mixed Liquor Concentration, mg/L | No. of Measurements | Average ATP Concentration, pg/ml | Standard Deviation, pg/ml | Variance |
|---|---|---|---|---|
| 7 | 7 | 636 | 127 | 20% |
| 84 | 5 | 5,437 | 631 | 12% |
| 140 | 6 | 11,414 | 2,315 | 20% |

During the testing period, the mixed liquor was stirred every 1-2 minutes to prevent the solid settling. The variance of the results could be caused by the inhomogeneous solution due to fast solids settling in the sample. However, a variance less than 25% is considered to be acceptable. The correlation between ATP concentrations and culture-based lab testing results are plotted in FIG. 9.

Because ATP is present in all living cells, the ATP concentration assesses the total microbial content in the sample. The culture-based lab tests are often targeting specific microbial groups. Even though there are fundamental differences between ATP tests and culture-based tests, the results indicate good linear relationships between the ATP concentrations and E. Coli, HPC, and mixed liquor suspended solids. However, the linear correlation doesn't not exist for fecal coliform. The correlations between ATP concentrations and culture-based tests results can be site specific. Same correlation may not be applicable to other treatment systems or technologies. Thus, it is important to establish the ATP baseline and ATP correlations based on specific site. With the combination of the two, the sample ATP concentration provides a fast assessment of the water quality.

Evaluation of Bacteria Re-Growth

During the baseline signal collection period, 98% of the ATP concentration is below the detection limit and the rest 2% has ATP concentrations less than 250 pg/ml. The treatment system was in normal operation during the baseline collection period. The minor ATP concentration spikes could be a result of bacteria re-growth inside the process piping and water storage tank. The disinfection of permeate from ultra-filtration membranes relies on ozone and UV. Both disinfection systems do not provide the disinfection residues like chlorine does. However, chorine is not used on the daily basis due to the corrosion issue to the cooling tower and chiller heat exchangers. Treated water is recirculated from the water storage tank back to the upstream of the ozone and UV system to maintain a continuous disinfection. However, due to the lack of disinfection residue in the process piping and water storage tank, bacteria re-growth over a long period of time is expected.

Multiple permeate samples were collected to demonstrate the bacteria re-growth inside the process piping and water storage tank. These samples were sent to certified testing lab for qPCR and NGS analysis:

| Sample | Total Prokaryote, cells/ml |
|---|---|
| Disinfected Permeate Sample 1 | $3.77 \times 10^4$ |
| Disinfected Permeate Sample 2 | $1.02 \times 10^5$ |
| Undisinfected Permeate Collected downstream the UV system, with no recirculation | $1.08 \times 10^4$ |
| Undisinfected Permeate collected downstream the permeate pump | <detection limit |

The disinfected permeate sample 1 and 2 were collected downstream of the UV disinfection. Due to the recirculation from water storage tank to the head of the disinfection system (ozone), the disinfected samples consist of fresh permeate from membranes filtration and recirculation flow from the water storage tank. Undisinfected permeate collected at downstream of the UV system represents the fresh permeate passing through the process piping between the membranes and the water storage tank without the operation of the disinfection and recirculation flow from the water storage tank. Undisinfected permeate collected at downstream of the permeate pump represents the fresh permeate from the membranes without going through any downstream process piping.

The above results indicate that fresh permeate without passing through the rest of the process piping has the least amount of total prokaryote, which is below the detection level. The fresh permeate passing through the process piping without the disinfection and recirculation flow has the second least of the total prokaryote. Both disinfected permeates combining the recirculation flow have the highest total prokaryote. This indicates that the bacteria are entrained into the treated water either from the process piping or from the storage tank. FIG. 10 summarized the NGS data of the first 3 permeate samples.

Severe bacteria re-growth will impact the water quality and its safe use. Information of the frequency and concentrations of ATP detections from the ATP analyzer under normal operation conditions will help determine the severeness of the bacteria re-growth. The data from the ATP analyzer will support the informative decision making of disinfecting the process piping and the storage tank.

CONCLUSIONS

The deviation from the baseline ATP concentration indicates the change of the water quality. The correlation between ATP concentrations and culture-based testing results has been established through the challenge tests. Although it may be site specific, the correlation can be used as a quick assessment of certain pathogens concentration while waiting for the verification from culture-based testing results. Continuous monitoring the water quality via the ATP analyzer allows an early detection of the treatment failures and facilitates the operation team to conduct preventive and corrective actions. From this study, it is demonstrated that the ATP analyzer is a powerful online monitoring tool to determine the microbial content in water samples, which can be used as direct indications of water quality, status of system operation, and bacteria re-growth within the treatment system. With more and more stringent regulations on decentralized non-potable water reuse systems, the online ATP monitoring can be an effective supplement to the existing online monitoring methods as well as culture-based testing methods.

The phraseology and terminology used herein is for the purpose of description and should not be regarded as limiting. The use of "including," "comprising," "involving," "having," "containing," "characterized by," "characterized in that," and variations thereof herein is meant to encompass the items listed thereafter, equivalents thereof, as well as alternate embodiments consisting of the items listed thereafter exclusively. Use of ordinal terms such as "first," "second," "third," and the like in the claims to modify a claim element does not by itself connote any priority.

While exemplary embodiments have been disclosed, many modifications, additions, and deletions may be made therein without departing from the spirit and scope of the disclosure and its equivalents, as set forth in the following claims.

Those skilled in the art would readily appreciate that the various parameters and configurations described herein are meant to be exemplary and that actual parameters and configurations will depend upon the specific application for which the embodiments are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, the disclosed systems and methods may be practiced otherwise than as specifically described. The present systems and methods are directed to each individual feature described herein. In addition, any combination of two or more such features, if not mutually inconsistent, is included within the scope of the present disclosure.

Further, it is to be appreciated that various alterations, modifications, and improvements will readily occur to those skilled in the art. Such alterations, modifications, and improvements are intended to be part of this disclosure, and are intended to be within the spirit and scope of the disclosure. In some embodiments, an existing system or method may be modified to implement or incorporate any one or more aspects of the disclosure. Thus, some embodiments may involve configuring an existing wastewater treatment system or method to include the integration described herein. For example, an existing DNWS system or process may be retrofitted for online biological monitoring thereof in accordance with one or more embodiments. Accordingly, the foregoing description and drawings are by way of example only. Further, the depictions in the drawings do not limit the disclosures to the particularly illustrated representations.

What is claimed is:

1. A method for online biological monitoring in a decentralized non-potable water reuse system, comprising:

accessing a wastewater treatment system of the decentralized non-potable water reuse system, the decentralized non-potable water reuse system configured to locally collect, treat and store water associated with a single building or a group of buildings in close proximity, the wastewater treatment system configured to treat at least graywater associated with the decentralized non-potable water reuse system;

establishing a baseline of a total biological count of treated water at an outlet of the wastewater treatment system, the established baseline being site-specific to the decentralized non-potable water reuse system; and performing online monitoring of the total biological count associated with treated water discharged from the wastewater treatment system relative to the established baseline to, in turn, monitor for any change in an operational condition of the decentralized non-potable water reuse system.

2. The method of claim 1, wherein at least one of a dissolved adenosine triphosphate (dATP), a cellular ATP (cATP) and/or a total ATP (tATP) concentration of the treated water is monitored.

3. The method of claim 2, wherein treated water is sampled downstream of a disinfection process for online monitoring.

4. The method of claim 3, wherein multiple samples of treated water are collected and analyzed per day.

5. The method of claim 2, further comprising comparing the monitored concentration to a predetermined threshold level, and still further comprising providing a notification to a system operator if the monitored concentration exceeds the predetermined threshold level.

6. The method of claim 5, further comprising performing a culture-based test periodically for validation and/or in response to a deviation from the predetermined threshold level.

7. The method of claim 6, further comprising establishing a site-specific correlation between online biological monitoring results and culture-based biological test results.

8. The method of claim 2, further comprising correlating ATP concentration to mixed liquor suspended solids.

9. The method of claim 2, wherein a frequency and/or concentration of ATP detections is applied to determine severeness of bacterial regrowth.

10. The method of claim 1, further comprising performing a non-biological water quality measurement of temperature, pH, turbidity or percent solids.

11. The method of claim 1, further comprising correlating the monitored total biological count to at least one of: treated water quality, wastewater treatment energy efficiency, membrane filtration performance, disinfection effectiveness, and bacterial regrowth in pipes and/or storage tanks.

12. The method of claim 1, further comprising taking a preventative or corrective action in response to the monitored total biological count exceeding a predetermined threshold level via closed-loop control.

13. The method of claim 12, further comprising bypassing the decentralized non-potable water reuse system to a potable mode of operation while the preventative or corrective action is taken.

14. The method of claim 1, further comprising:

transferring thermal energy associated with the wastewater treatment system to an onsite heat pump to recover thermal energy; and delivering at least a portion of the recovered thermal energy to an onsite energy demand.

15. The method of claim 1, further comprising delivering treated water for one or more non-potable applications.

16. The method of claim 1, wherein online monitoring is performed downstream of at least one of: membrane treatment, UV treatment or ozone treatment.

17. The method of claim 1, further comprising monitoring a total biological count upstream of the water treatment system or at a point of reuse.

18. The method of claim 1, further comprising analyzing water quality data over time to facilitate optimization of system maintenance in terms of frequency of cleaning and/or distribution system flushing.

19. A system, comprising:

a decentralized non-potable water reuse system including a wastewater treatment system, the decentralized non-potable water reuse system configured to locally collect, treat and store water associated with a single building or a group of buildings in close proximity, the wastewater treatment system configured to treat at least graywater associated with the decentralized non-potable water reuse system;

an online analyzer constructed and arranged to monitor a total biological count associated with treated water discharged from the wastewater treatment system; and a closed-loop control system in communication with the online analyzer and configured to provide a notification to a system operator if the monitored total biological count exceeds a predetermined threshold level in terms of deviation from a site-specific baseline.

20. The system of claim 19, wherein the online analyzer monitors at least one of a dissolved adenosine triphosphate (dATP), a cellular ATP (cATP) and/or a total ATP (tATP) concentration of the treated water.

21. The system of claim 19, wherein the closed-loop control system is further configured to perform a preventative or corrective action prior to performance failure or breakthrough detection in response to the monitored concentration exceeding the predetermined threshold level.

22. The system of claim 21, wherein membrane, tank or pipe cleaning or other system maintenance is performed responsive to the monitored concentration exceeding the predetermined threshold level.

23. The system of claim 21, wherein UV intensity, ozone dose, chemical feed, flow rate or residence time in association with one or more unit operations is adjusted responsive to the monitored concentration exceeding the predetermined threshold level.

24. The system of claim 19, wherein the wastewater treatment system comprises at least one of a: flow equalization tank, a primary settling unit operation, a biological treatment unit operation, a filtration unit operation, a disinfection unit operation, and treated water storage.

25. The system of claim 24, wherein the system comprises a membrane bioreactor.

26. The system of claim 19, further comprising:

a heat pump configured to deliver thermal energy to an onsite energy demand; and a heat exchanger, proximate to and in thermal communication with the onsite wastewater treatment system and the heat pump, the heat exchanger configured to convey thermal energy to the heat pump.

27. The system of claim 19, wherein the online analyzer is arranged in a flow-through configuration.

28. The system of claim 19, wherein the system is configured to recirculate treated water upstream of the wastewater treatment system to maintain continuous disinfection without residual chlorine.

29. The system of claim 19, wherein the closed-loop control system is configured to isolate a potential problem in process piping or treated water storage tanks.

30. The system of claim 19, wherein the wastewater treatment system is further configured to treat blackwater, foundation drainage, stormwater and/or rainwater associated with the decentralized non-potable water reuse system.

31. A method of retrofitting a decentralized non-potable water reuse system configured to locally collect, treat and store water associated with a single building or a group of buildings in close proximity, comprising:

installing an online biological analyzer downstream of a wastewater treatment system and upstream of a point of use in the decentralized non-potable water reuse system, the online biological analyzer constructed and arranged to monitor a total biological count associated with treated water produced by the wastewater treatment system;

establishing a baseline of a total biological count of treated water at an outlet of the wastewater treatment system, the baseline being site-specific to the decentralized non-potable water reuse system; and interconnecting the online biological analyzer with a closed-loop controller configured to perform a preventative or corrective action in response to the monitored total biological count exceeding a predetermined threshold level in terms of deviation from the site-specific baseline.

32. The method of claim 31, wherein the online biological analyzer monitors at least one of a dissolved adenosine triphosphate (dATP), a cellular ATP (cATP) and/or a total ATP (tATP) concentration of the treated water.

33. The method of claim 32, wherein the online biological analyzer samples the treated water multiple times per day.

34. The method of claim 31, further comprising installing an onsite heat pump to recover thermal energy from the wastewater treatment system for delivery to an onsite energy demand.

* * * * *